Dec. 23, 1958        H. GRUBER        2,865,203
HEAT-CONDUCTION MANOMETERS
Filed April 20, 1954
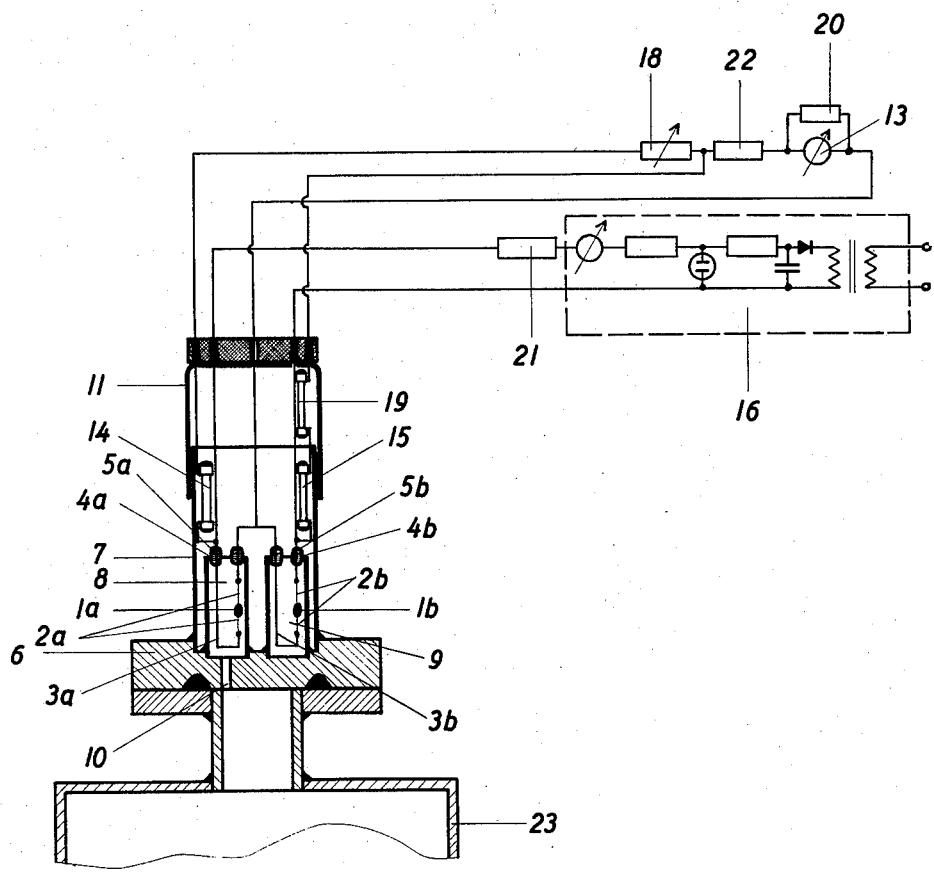
Inventor
Helmut Gruber
by Klein & Hart
his attorneys.

# United States Patent Office 2,865,203
Patented Dec. 23, 1958

2,865,203

HEAT-CONDUCTION MANOMETERS

Helmut Gruber, Hanau-on-Main, Germany, assignor to W. C. Heralus G. m. b. H., Hanau-on-Main, Germany, a German body corporate Application April 20, 1954, Serial No. 424,475

Claims priority, application Germany April 25, 1953

6 Claims. (Cl. 73—399)

This invention relates to heat-conduction manometers, and more particularly, to manometers for measuring gas pressure in the range extending from about $10^{-5}$ mm. Hg to about 100 mm. Hg.

The invention provides a manometer of increased sensitivity and low response time lag, particularly below pressures of $10^{-2}$ mm. Hg, by the use of a sensing element with a low heat capacity.

The invention also provides a manometer which has improved stability and which is free from undesirable variations of accuracy due to lack of uniformity in the construction of the various components used in the manometers.

Briefly, the invention contemplates a vacuum tight measuring chamber which communicates with a receptacle containing gas whose pressure is to be measured. A sensing resistor is suspended in the measuring chamber between two electrodes of a metal which is a good conductor for an electric current. Preferably, the sensing resistor is a small semi-conductor bead having a negative temperature coefficient of resistance. The electrodes are supported at their outward ends between a pair of relatively sturdy connection wires, which are sealed through the walls of the vacuum tight measuring chamber.

The thickness of the electrodes connected to the sensing resistor is made small relative to the length of the electrodes so that heat conduction along them, even at the lowest range of operation of the manometers, is, at the most, only equal to the heat transmitted by the sensing resistor to the ambient gas.

The sensing resistor is in the measuring branch of a four-arm bridge circuit, and an adjacent branch of the bridge includes a similarly constructed reference resistor which is disposed in a reference chamber in which gas pressure is kept substantially constant.

In heat conduction manometers, the measurement of low gas prressures depends on the variation of heat conductivity of the gas surrounding the sensing resistor. Semi-conductors having a negative temperature coefficient of resistance can be made very small, and thus have a very low heat capacity. This quality makes them particularly suitable as sensing and reference resistors, because they quickly respond to any variations in thermal conductivity of ambient gas. One type of semi-conductor having a negative temperature coefficient of resistance, which is suitable for this invention, is made of a mixture of metals, metal oxides, particularly the lower metal oxides, and is sold under the trade name Thermistor.

Reducing the thermal conductance of the electrodes connected to the sensing and reference resistors, in accordance with this invention, extends the useful range of the manometer well below $10^{-2}$ mm. Hg. This is due to the fact that the small dimensions of the electrodes insure that the heat transmission through them will, even at pressures of $10^{-2}$ mm. Hg and less, not exceed the heat transmitted by the sensing resistor to the ambient gas. Therefore, the thermal loss from the sensing resistor to the ambient gas is large enough, compared to heat loss through the electrodes, for pressure measurement.

Preferably, the electrodes are in the form of wires or foils of a length that is large compared to their thickness. Particularly suitable are thin electrodes of platinum or platinum alloys having a thickness not exceeding 25 microns, and having a length between 25 and 50 mm., preferably 30 to 40 mm. The heat transmission of the electrodes may be calculated from the product of the electrode cross-section, the heat conductivity of the metal used in the electrode, and the reciprocal value of the electrode length. For the manometer of this invention to have a sensitivity down to $10^{-4}$ mm. Hg, the heat conductance of an electrode should not exceed $4 \times 10^{-7}$ cal./sec. ° C.

In a preferred form of the invention, the measuring chamber in which the sensing resistor is enclosed is made of a metal with good heat conductivity, preferably copper or brass. Preferably, the reference resistor is enclosed in a reference chamber, which is also made of a metal with good heat conductivity and in which a relatively high pressure is maintained, for example, atmospheric pressure. The reference chamber may, if desired, communicate with the atmosphere through a small aperture.

Heat conduction manometers often present the problem of instability due to changes in ambient temperature, and due to non-uniformity of the various components. This invention substantially eliminates the instability caused by these factors by providing compensating resistors in the manometer circuit. For example, the sensing resistor and the reference resistor each make up two adjacent arms of a four-arm bridge. The other two arms of the bridge are each made up of a pair of compensating resistors having equal resistance and equal positive temperature coefficient of resistance. Three of the four compensating resistors are arranged within a metal housing which encloses both the measuring chamber and the reference chamber. The fourth compensating resistor is located outside of the metal housing and is variable. Preferably, a stabilizing resistor having a positive temperature coefficient of resistance is located within the metal housing and is connected in parallel with a measuring instrument which in turn is connected across the bridge output.

The manometer of this invention is suitable not only for measuring gas pressure in the relatively large pressure range between $10^{-5}$ mm. Hg and 100 mm. Hg, but, because of its fast response, also is ideally suitable for use as a leak detector and for the control of vacuum systems, for example, in maintaining constant pressure.

These and other aspects of the invention will be more fully understood from the following detailed description, taken in conjunction with the accompanying drawing, which is a schematic circuit diagram and sectional view of the preferred embodiment of the invention.

Referring to the drawing, the manometer includes a measuring tube or housing 7 which is made of a metal of good heat conductivity, such as copper or brass, and which is connected by an outwardly extending flange 6 to an enclosure 23 which contains a gas whose pressure is to be measured. A measuring chamber 8 and a reference chamber 9 are located within the measuring tube. The measuring chamber communicates with the enclosure through a passage 10 in the flange 6. The reference chamber may be completely sealed as shown in the drawing, or it may communicate with the atmosphere through a small aperture (not shown) in the wall of the measuring tube.

The measuring and reference chambers contain, respectively, a measuring or sensing resistor 1a and a reference resistor 1b. Preferably, the sensing and the measuring resistors are the same physical size, have the same resistance, and are in the form of a small bead, which may be, for example, less than .25 cubic mm. The composition of the beads is that of the commercially available Thermistor, but any commercially available suitable semi-conductor may be used. The temperature coefficient of the beads may be, as a typical example, $-3\%$ to $-4.5\%$ per ° C. at approximately 20° C. Their resistance is between 1000 to 3500 ohms. An advantage of resistors of this type is that even after extended use, their resistance varies only by a negligible amount. The sensing and reference resistors are respectively supported between electrodes 2a and 2b, which are very thin wires or foil, preferably of platinum or platinum alloys. In one form, which has been found suitable for use in the invention, the electrodes are each 25 to 50 mm. in length, and they are each less than 25 microns thick. The outer ends of each of the electrodes 2a and 2b are, respectively, bonded to relatively sturdy connecting wires 3a and 3b, which are, respectively, sealed by glass-fused joints 5a, 5b through closure plates 4a, 4b of the measuring and reference chambers, respectively. The ends of the connecting wires terminate in a plug-in contact sleeve 11.

As stated previously, the sensing and reference resistors are connected together to form adjacent arms of a four-arm bridge arrangement. The other two arms of the bridge are compensating arms, and the one of them adjacent the sensing resistor includes a compensating resistor 14 in series with an adjustable compensating resistor 18. The other compensating arm adjacent the reference resistor includes compensating resistors 15 and 19 in series. Preferably, all of the compensating resistors in the bridge arms are of equal resistance and have equal positive temperature coefficients of resistance. Also, preferably, resistors 14, 15, and 19 are positioned within the metal housing as shown in the drawing, and adjustable resistor 18 is located outside the housing.

A measuring instrument 13 is connected across the bridge output and located outside the housing. To increase the stability of the manometer, a resistor 20 having a positive temperature coefficient of resistance is connected in parallel with the meter and also preferably has a resistance equal to the internal resistance of the meter. A resistor 22 is connected in series with the meter. The meter is suitably graduated to read directly the pressure to be measured. The output of the bridge may also be used to control an amplifier system which in turn can be used to control the pressure of the system which is being measured.

Current is supplied to the bridge input from a D. C. voltage regulating arrangement 16. Metal diaphragms or baffles (not shown) may be interposed in the connection between the measuring tube 8 and the enclosure 23 so that any vapors which may be present in the vacuum chamber are prevented from entering the measuring chamber where they might contaminate the sensing resistor or chemically attack the electrodes. The metal housing may also be water cooled by suitable means (not shown) to insure more uniform temperature conditions.

I have found that with the bridge balanced at normal atmospheric pressure, the most favorable sensitivity at low pressure ($10^{-5}$ mm. Hg to $10^{-3}$ mm. Hg) results when the ratio of the resistance of the sensing resistor to the resistance of the adjacent compensating resistor 14 is between 2 and 3, preferably 3. A displacement of the measuring range toward lower pressures, say down to $10^{-5}$ mm. Hg is obtained by applying constant voltage to the bridge input so that when the resistance drops, due to the reduction of gas pressure in the measuring chamber, current in the sensing resistor rises more steeply, causing the instrument sensitivity at lower pressures to be increased.

Displacement of the measuring range toward lower pressures is also enhanced by increasing the resistance of the sensing and measuring resistors, for example, by using 150,000 ohm resistors with negative temperature coefficients of resistance.

The vacuum meter of this invention has the advantage over previous thermoelectric vacuum meters that even in the presence of oil vapors it is very resistant to aging, i. e., deterioration due to continued use.

A vacuum meter constructed as described above has a measuring range between 100 mm. Hg and $10^{-5}$ mm. Hg, with particularly high sensitivity of pressures at $10^{-3}$ mm. Hg. The manometer has the further advantage of a low power consumption of a few watts, and therefore is not excessively heated in operation. For example, a flashlight battery is a sufficient source of power for the instrument.

Another advantage of this invention is that the inexpensive sensing and measuring resistors are easily replaced, while in the case of prior art thermoelectric vacuum meters, it is necessary to replace the thermoelectric wires, which are awkward to handle. The sensing and measuring resistors also retain constant operating characteristics over long periods of time because they operate at relatively low operating temperatures between about 50° C. and 150° C. This enhances the stability and long life of the instrument.

The stability of the manometer is also improved by making the two compensating resistors 14 and 15 equal in resistance and selecting them to have identical temperature coefficients of resistivity, because their resistances increases with increasing temperature, thereby causing an increase in current in the sensing and reference resistors of the bridge. For example, at 40° C. this arrangement increases instrument sensitivity by 5–10%. However, under this condition, the zero point of the apparatus tends to drift, and the compensation resistor 19 aids in stabilization of the zero point.

A resistor 21 in series with the bridge input compensates further for variations in sensitivity. It has a negative temperature coefficient of resistance and therefore it decreases in resistance as temperature increases, thereby increasing the power input to the bridge as the pressure of the gas around the sensing resistor is reduced. The resistor 22 in series with the meter 13 further aids in instrument stability.

A manometer constructed as described above is surprisingly independent from instability due to variations of room temperature within a range of 15° to 45° C. However, improved instrument stability is achieved by providing suitable cooling means to maintain the housing 7 at a constant temperature.

As indicated previously, instrument operation is improved by making the ratio of heat loss through the electrodes 2a and 2b to the heat loss from the sensing and measuring resistors as small as possible. Actual tests with a vacuum meter built according to this invention demonstrated substantially advantages over prior vacuum meters. For example, after an extended time of operation, hardly any aging phenomenom could be ascertained, and more particularly, no damage, such as is caused in prior art thermoelectric vacuum meters by overheating after aging, was noted.

The response time of the instrument was also relatively short. For example, when the pressure being measured was held constant, only 25 seconds were required after power was supplied to the instrument for the meter to reach 95% of its ultimate deflection. When the meter was maintained at operating temperature and subjected to various pressures, response times of as little as two to three seconds were obtained. In the contrast to this, it is not advisable to maintain prior art thermoelectric vacuum meters at separate temperatures for prolonged periods, because of possible damage to the sensing elements. Therefore, the prior art meters are not able to provide measurements as quickly as the vacuum meter of this invention.

I claim:
1. A heat-conducting manometer adapted for measuring gas pressures in the range of 10 mm. of Hg to at least $10^{-3}$ mm. of Hg comprising a metal housing means, a measuring chamber mounted within said housing means, means for attaching said housing means to an enclosure in which the gas pressure is to be measured, means providing a communication between the interior of said measuring chamber and said enclosure, a gas-tight reference chamber mounted within said housing means, a pair of relatively sturdy conductor wires insulatingly sealed in the walls of each of said chambers and extending into said chambers, a resistor comprising a semi-conductor bead having a negative temperature coefficient of resistance in each chamber, a pair of metal electrode members of high electric conductivity in each chamber connecting said bead to said conductor wires and forming a support for said bead, a measuring instrument, electric circuit means connected to said conductor wires and extending between said housing means and said measuring instrument and forming a measuring bridge jointly with said beads, said electrode members and said conductor wires, said bridge having a measuring branch including said resistor which is within said measuring chamber, a reference branch including said resistor which is within said reference chamber, and a diagonal branch including said measuring instrument connected between the juncture of said beads and the juncture of the other two branches, two resistors having a positive temperature coefficient of resistance in each of the other two branches of said bridge circuit means, said resistors having equal resistance and equal positive temperature coefficients of resistance, three of said four resistors having positive temperature coefficients of resistance being arranged within said metal housing means and the fourth one being adjustable and disposed outside of said metal housing, and a resistor disposed outside of said metal housing means having a positive temperature coefficient of resistance and connected in parallel with said measuring instrument.

2. Heat-conduction manometer as claimed in claim 1, wherein the electrodes between which the resistance bead is suspended in the measuring chamber, have a thickness of not more than 50 $\mu$ and a length of 25 to 50 mm.

3. Heat-conduction manometer as claimed in claim 1, wherein the electrodes between which the resistance bead is held in the measuring chamber, are so thin that the heat-conduction through them does not exceed $4 \times 10^{-7}$ calories per second per degree centigrade.

4. Heat-conduction manometer as claimed in claim 1, wherein the ratio of the resistance values of the measuring resistor and the bridge equalising resistor adjacent to it has a numeric value between 2 and 3.

5. Heat-conduction manometer as claimed in claim 1, wherein said resistor parallel to the measuring instrument in the diagonal branch has the same resistance value as the internal resistance of the measuring instrument.

6. Heat-conduction manometer as claimed in claim 1, characterised in that in the current-supply line to the measuring bridge includes a series-connected resistor of negative temperature coefficient of resistance.

References Cited in the file of this patent

UNITED STATES PATENTS

| | | |
|---|---|---|
| 1,971,423 | McIlvaine | Aug. 28, 1934 |
| 2,197,079 | Penning | Apr. 16, 1940 |
| 2,242,465 | Green et al. | May 20, 1941 |
| 2,736,200 | Kleimack et al. | Feb. 28, 1956 |

FOREIGN PATENTS

| | | |
|---|---|---|
| 701,478 | Germany | Jan. 17, 1941 |

OTHER REFERENCES

Leck: Journal of Scientific Instruments, vol. 29, August 1952, pp. 259, 260 relied on.